US012637000B1

(12) United States Patent　　　　(10) Patent No.:　US 12,637,000 B1
Zhang　　　　　　　　　　　　　　　(45) Date of Patent:　May 26, 2026

(54) REARVIEW MIRROR HAVING A LIGHT AND A LENS AND HOUSING WITH FIXING MECHANISM

(71) Applicant: Yongbao Zhang, Jiangmen (CN)

(72) Inventor: Yongbao Zhang, Jiangmen (CN)

( * ) Notice: Subject to any disclaimer, the term of this patent is extended or adjusted under 35 U.S.C. 154(b) by 0 days.

(21) Appl. No.: 19/269,475

(22) Filed: Jul. 15, 2025

(30) Foreign Application Priority Data

Apr. 8, 2025　(CN) .......................... 202520649554.8

(51) Int. Cl.
　　*B60Q 3/258*　　　(2017.01)
　　*B60Q 3/64*　　　 (2017.01)
　　*B60Q 3/82*　　　 (2017.01)
　　*B60R 1/04*　　　 (2006.01)
　　*B60R 1/12*　　　 (2006.01)
　　*F21V 5/04*　　　 (2006.01)
　　*F21V 19/00*　　　(2006.01)
　　*F21Y 103/10*　　 (2016.01)
　　*F21Y 113/00*　　 (2016.01)
　　*F21Y 115/10*　　 (2016.01)
(52) U.S. Cl.
　　CPC .............. *B60Q 3/258* (2017.02); *B60Q 3/64* (2017.02); *B60Q 3/82* (2017.02); *B60R 1/04* (2013.01); *B60R 1/1207* (2013.01); *F21V 5/04* (2013.01); *F21V 19/003* (2013.01); *F21Y 2103/10* (2016.08); *F21Y 2113/00* (2013.01); *F21Y 2115/10* (2016.08)
(58) Field of Classification Search
　　CPC ......... B60Q 3/58; B60R 1/06; F21Y 2115/10; F21Y 2103/00; F21Y 2103/10; F21Y 2103/20; F21Y 2103/30; F21Y 2103/33; F21Y 2103/37; F21V 21/088; F21V 21/0885; F21V 19/003
　　See application file for complete search history.

(56) References Cited

U.S. PATENT DOCUMENTS 10,414,341 B2 * 9/2019 Pan ........................ B60Q 3/258
11,198,387 B1 * 12/2021 Matsu ................... F21V 23/005
11,221,132 B1 * 1/2022 Ding ....................... F21V 23/06

FOREIGN PATENT DOCUMENTS

CN　　　　2841416 Y　　11/2006

* cited by examiner

*Primary Examiner* — Robert J May
(74) *Attorney, Agent, or Firm* — JEEN IP LAW, LLC

(57)　　　　　　ABSTRACT

A rearview mirror with a light is provided, which includes a lens, a housing, and a fixing mechanism. The lens is assembled on a front of the housing, the fixing mechanism is provide on the housing, and the lens is assembled with an original vehicle rearview mirror; a light groove is provided in the housing, and a light source is provided in the light groove; the light source is connected to a circuit board, and the circuit board is connected to a battery. The battery and circuit board are provided together in the housing, and the light source, circuit board, and battery are covered in the housing by the lens. After installing the entire rearview mirror on the original rearview mirror, only turning on the light source can illuminate the back of the lens, enabling a user to look in the mirror, apply makeup, etc. in dim conditions.

10 Claims, 4 Drawing Sheets

REARVIEW MIRROR HAVING A LIGHT AND A LENS AND HOUSING WITH FIXING MECHANISM

CROSS-REFERENCE TO RELATED APPLICATIONS

This application claims priority to Chinese Patent Application No. 202520649554.8, filed on Apr. 8, 2025, which is hereby incorporated by reference in its entirety.

TECHNICAL FIELD

The present disclosure relates to the field of car rearview mirror products technologies, and in particular, to an additional rearview mirror for installation in a car driver's cab.

BACKGROUND

The rearview mirror is an important device in the car driver's cab, mainly used to observe the situation of people inside the car. Usually, the original rearview mirror inside a car is pre-installed by the car manufacturer and cannot be retrofitted by the user. However, most of the original rearview mirrors cannot meet the needs of the user. For example, the original car's rearview mirror has a smaller area and a narrower illumination range. For example, the original car rearview mirror has few functions and usually only serves as a regular mirror. For this purpose, people have invented additional rearview mirrors, such as the externally mounted interior rearview mirror disclosed in CN200520111271.0. But this external rearview mirror only has the effect of increasing the mirror area and cannot provide lighting function.

SUMMARY

The present disclosure provides a rearview mirror having a light that has a simple structure, a more reasonable design, can expand the field of view of the original vehicle rearview mirror, and can provide lighting illumination to address the shortcomings of existing technology.

To solve the above technical problems, the present disclosure adopts the following technical solution: a rearview mirror having a light, which is provided on an original rearview mirror in a car driver's cab, where the rearview mirror having a light includes a lens, a housing, and a fixing mechanism; the lens is assembled on a front of the housing, the fixing mechanism is provided on the housing, and the lens is assembled with the original rearview mirror through the fixing mechanism; where a light groove is provided in the housing, and a light source is provided in the light groove; the light source is connected to a circuit board, and the circuit board is connected to a battery; the battery and the circuit board are provided together in the housing, and the light source, the circuit board, and the battery are covered in the housing by the lens.

In some embodiments of the present disclosure, there are a plurality of light grooves that are provided along an inner edge of the housing, and there are a plurality of light sources that are provided along the light grooves.

In some embodiments of the present disclosure, the light sources are a light strip or a light bar with LED light beads.

In some embodiments of the present disclosure, a side wall of the housing is a transparent structure, and the light strip or light bar is fixedly provided on a groove wall of the light grooves in a side standing posture, so that the LED light beads form a side standing posture and face a transparent side wall of the housing, or the light strip or light bar is fixed in a flat position at bottoms of the light grooves, so that the LED light beads face a back of the lens.

In some embodiments of the present disclosure, a light guiding diffuser is provided in front of the light grooves, and the light sources are covered by the diffuser to form a uniform diverging structure for light; where the lens is covered in front of the diffuser.

In some embodiments of the present disclosure, a fixing plate is provided inside the housing by a screw, and the lens is fixedly provided on the fixing plate by adhesive, glue or buckle.

In some embodiments of the present disclosure, a touch switch is provided on the circuit board, and a switch touch area is provided on the lens, and the switch touch area is connected to the touch switch on the circuit board to form a touch control structure.

In some embodiments of the present disclosure, the LED light beads are further provided on the circuit board; the LED light beads on the circuit board are located in an area enclosed by the light strip or light bar; the housing is provided with a charging interface, and the charging interface is connected to the circuit board.

In some embodiments of the present disclosure, there are a plurality of heat dissipation holes provided on the housing, and the heat dissipation holes communicate inside and outside of the housing.

In some embodiments of the present disclosure, the fixing mechanism includes a fixing buckle and a movable buckle, the fixing buckle is fixedly provided in a clamp foot located on a back of the housing, the movable buckle is provided in the housing and is extended out of the back of the housing to face with the fixing buckle; an outer surface of the movable buckle is covered with a rubber housing; there is a sliding groove on the back of the housing, and the movable buckle is located in the sliding groove; a spring is provided in the housing, one end of the spring is connected to the housing and the other end of the spring is connected to the movable buckle; where the movable buckle is pulled towards the fixing buckle by the spring.

In the present disclosure, the light source and the circuit board are provided in the housing of the additional rearview mirror, and after installing the entire additional rearview mirror on the original rearview mirror, only turning on the light sources can illuminate the back of the lens with the light from the light sources, enabling a user to look in the mirror, apply makeup, etc. without turning on an interior light in a dim condition. The entire product structure is simple, convenient, and practical, without the need to modify the original rearview mirror to achieve the effect of expanding the reflection area and providing lighting function.

Numeral reference: 1—lens; 11—switch touch area; 2—housing; 21—light groove; 22—charging interface;

23—sliding groove; 24—clamp foot; 25—heat dissipation hole; 3—light strip; 31—LED light bead; 4—circuit board; 41—battery; 5—adhesive; 6—diffuser; 7—fixing plate; 81—fixing buckle; 82—movable buckle; 83—rubber housing; 84—spring; 9—screw.

DESCRIPTION OF EMBODIMENTS

Figure 1:
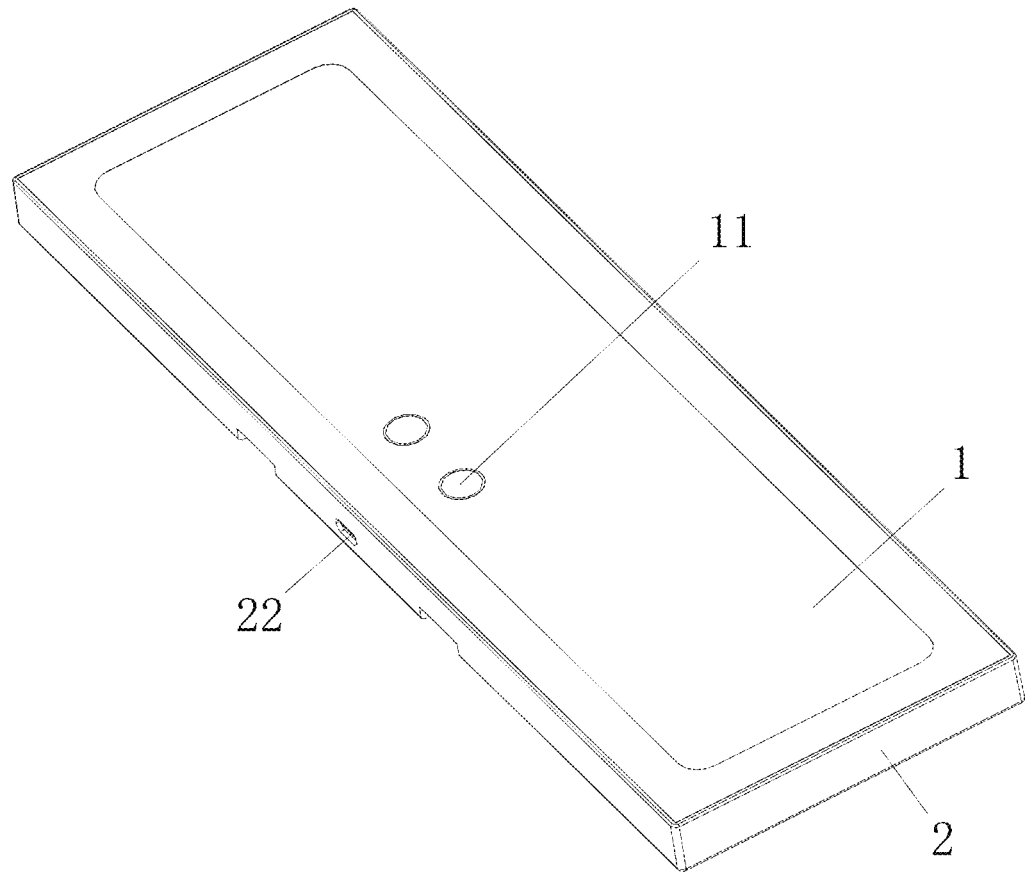
FIG. 1 is a first three-dimensional diagram of the present disclosure.
Figure 2:
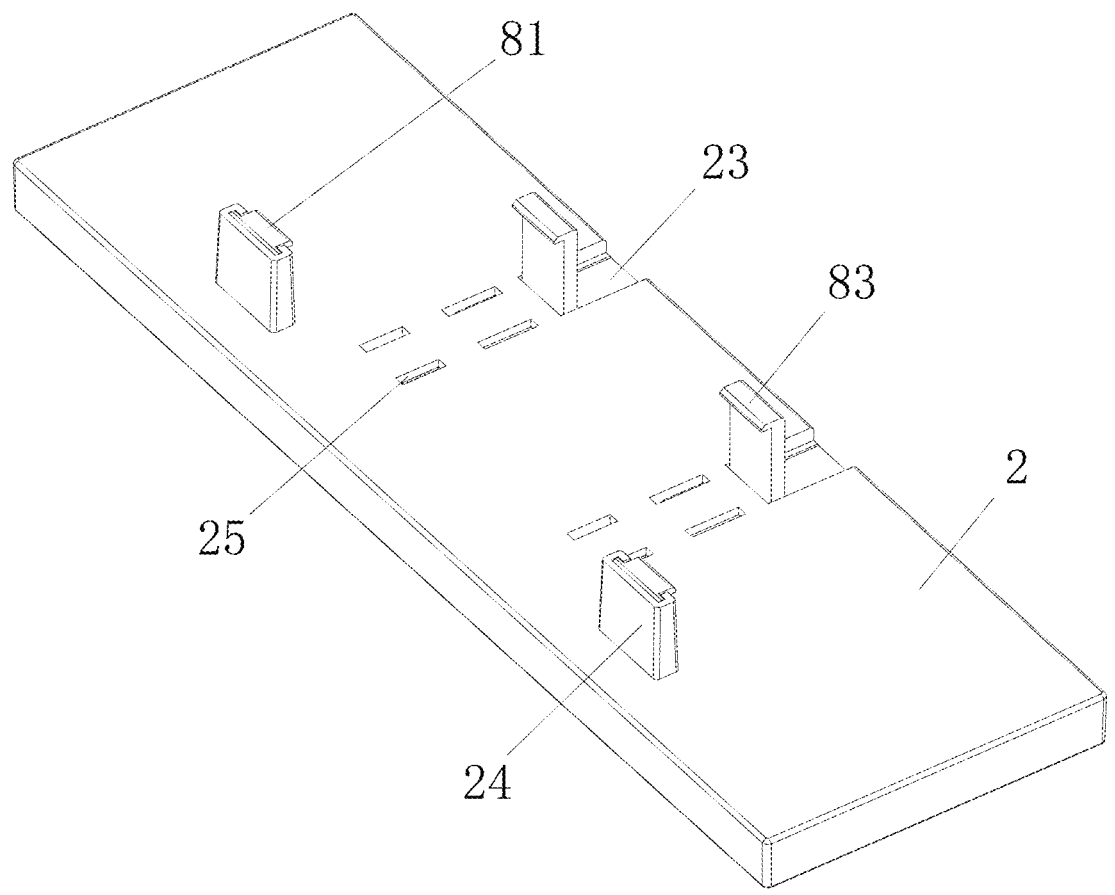
FIG. 2 is a second three-dimensional view of the present disclosure from another angle.
Figure 3:
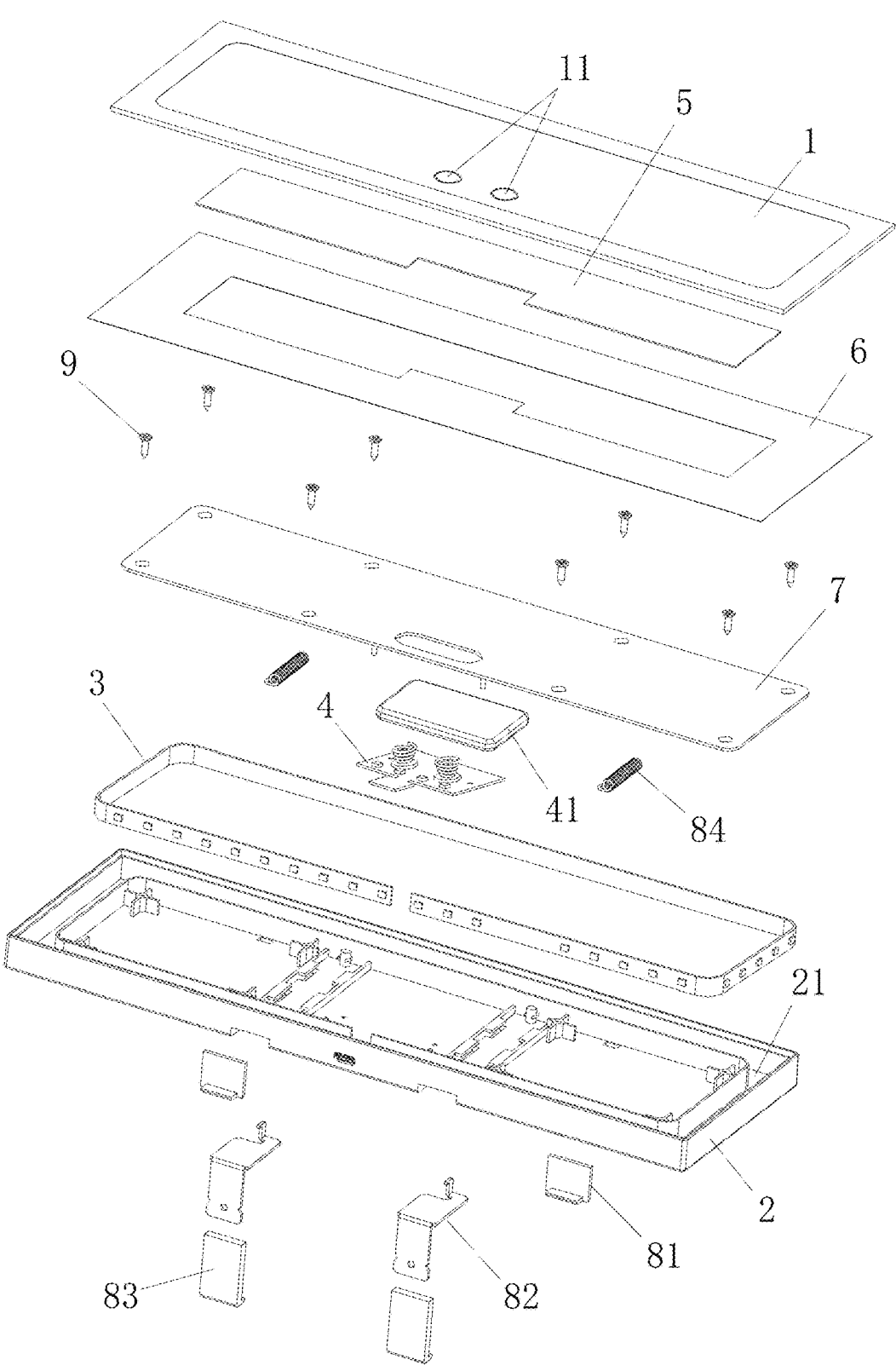
FIG. 3 is an exploded structure diagram of the present disclosure.
Figure 4:
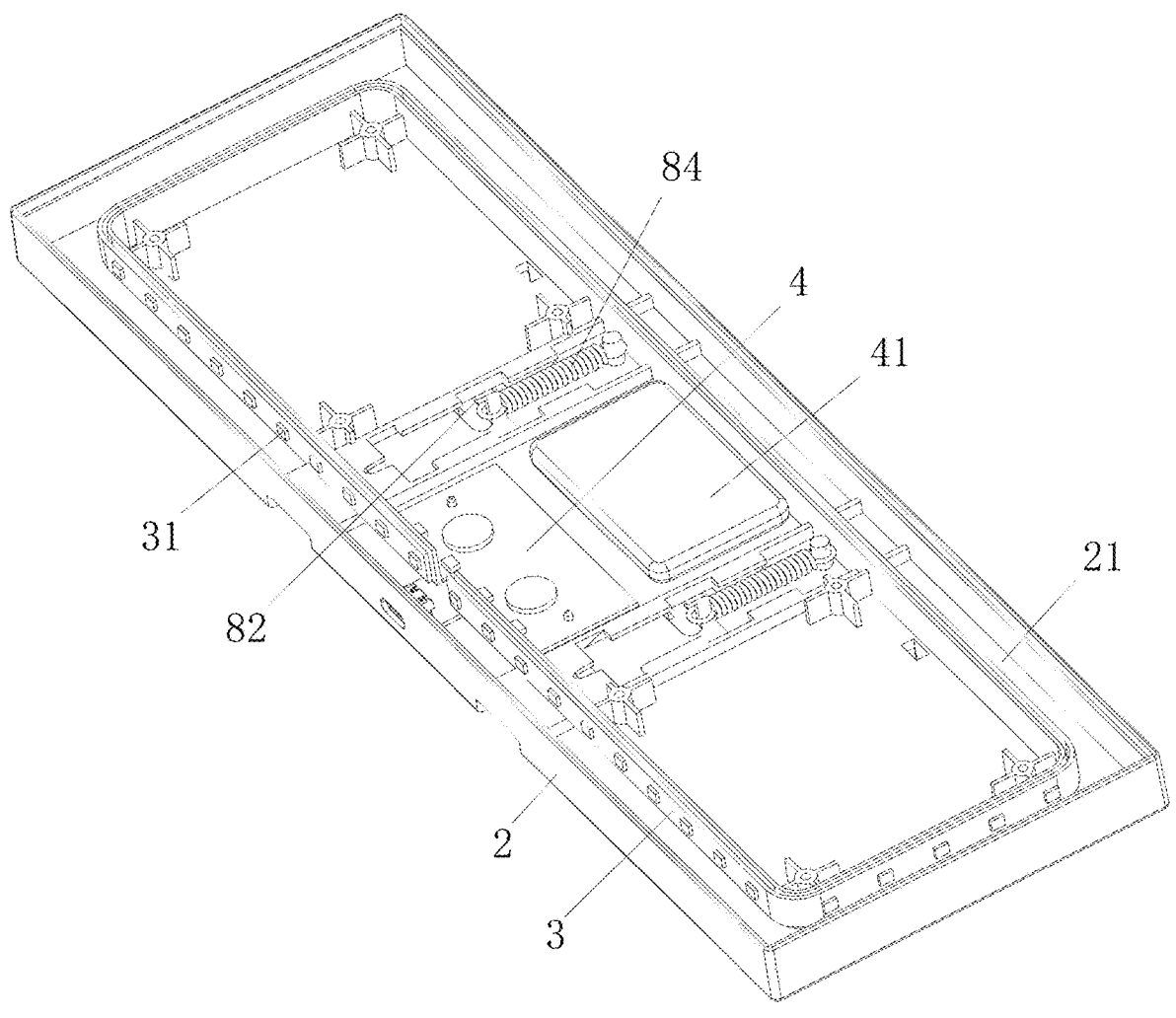
FIG. 4 is an internal structure of the present disclosure.

In this embodiment, referring to FIGS. 1-4, an additional rearview mirror having a light is provided on an original rearview mirror in a car driver's cab to replace the original rearview mirror. It includes a lens 1, a housing 2, and a fixing mechanism. The lens 1 is assembled on a front of the housing 2, and the fixing mechanism is provided on the housing 2. The lens 1 is assembled and fixed with the original rearview mirror through the fixing mechanism and a strap; a light groove 21 is provided in the housing 2, and a light source is provided inside the light groove 21. The light source is connected to a circuit board 4, and the circuit board 4 is connected to a battery 41 (such as a lithium battery). The battery 41 and the circuit board 4 are installed together in the housing 2; the light source, the circuit board 4, and the battery 41 are covered in the housing 2 by the lens 1. Besides that, it is also possible to connect a car power supply directly through a power cord without providing the battery.

There are a plurality of light grooves 21 that are arranged along an inner edge of the housing 2, and there are a plurality of light sources that are arranged along the light grooves 21, so as to obtain a more uniform and high brightness lighting effect with a smaller number of light sources.

The light sources are a light strip 3 (or light bar) with LED light beads 31. Of course, it is also possible to use a plurality of single LED lights attached to the light grooves 21 for illumination.

A side wall of housing 2 is a transparent structure, and the light strip 3 (or light bar) is fixed on a groove wall of the light grooves 21 in a side standing outward posture, so that the LED light beads 31 form a side standing posture and face toward a transparent side wall of housing 2. This is to prevent the light from shining directly onto the lens 1 from the back, rendering the light softer and less dazzling. Furthermore, the light can be emitted outward through the transparent side wall of the housing 2, which can provide illumination for a lower area and allow for a clearer observation of the operation buttons on the car. Of course, the light strip 3 (or light bar) can also be fixed in a flat position at bottoms of the light grooves 21, so that the LED light beads 31 form a posture facing the back of the lens 1, that is, a lying posture.

A light guiding diffuser 6 is provided in front of the light grooves 21, and the diffuser 6 covers the LED light beads 31 to form a uniform diverging structure for light, thereby further rendering the light more uniform and soft. The lens 1 is covered in front of the diffuser 6.

A fixing plate 7 is provided in the housing 2 through a screw 9, and the lens 1 is fixed to the fixing plate 7 with an adhesive 5, which can also be fixed using glue or a buckle.

A touch switch is provided on the circuit board 4, and a switch touch area 11 is provided on the lens 1. The switch touch area 11 is connected to the touch switch on the circuit board 4 to form a touch control structure. It can be set to multiple control modes, such as simply turning on or off the lights with a touch. It can also be achieved by touching and turning on the light to its maximum brightness, then holding it down for a plurality of seconds until the light gradually dims, and so on. The control mode can be changed by setting different programs.

The LED light beads are further provided on the circuit board 4, the LED light beads on the circuit board 4 are located in an area enclosed by the light strip 3 (or light bar). Different colored LED light beads can be used to achieve complementary lighting coordination. The housing 2 is provided with a charging interface 22 (such as TYPE-C interface), and the charging interface 22 is connected to the circuit board 4 for charging the battery 41.

There are a plurality of heat dissipation holes 25 provided on the housing 2, and the heat dissipation holes 25 communicate inside and outside of the housing 2 to dissipate heat generated by the LED light beads 31 in a more timely manner.

The fixing mechanism includes a fixing buckle 81 and a movable buckle 82. The fixing buckle 81 is fixedly provided in a clamp foot 24 located on a back of the housing 2, and the movable buckle 82 is movably provided in the housing 2 and is extended out of the back of the housing 2 to be opposite to the fixing buckle 81. An outer surface of the movable buckle 82 is covered with a rubber housing 83. A sliding groove 23 is provided on the back of the housing 2, and the movable buckle 82 is located inside the sliding groove 23 so as to slide along the sliding groove 23. A spring 84 is provided in the housing 2, one end of the spring 84 is connected to a fixing column inside the housing 2 and the other end of the spring 84 is connected to the movable buckle 82. The movable buckle 82 is pulled towards the fixing buckle 81 through the spring 84 to clamp the original rearview mirror, and then tied tightly to the original rearview mirror with a strap.

The above has provided a detailed explanation of the present disclosure. The above description is only preferred embodiments of the present disclosure, and cannot limit the scope of implementation of the present disclosure. Therefore, all equal changes and modifications made within the scope of the present application should still be within the scope of the present disclosure.

What is claimed is:

1. A rearview mirror having a light, comprising a lens, a housing, and a fixing mechanism;
   the lens is assembled on a front of the housing, the fixing mechanism is provided on the housing;
   wherein light grooves are provided in the housing, and light sources are provided in the light grooves;
   the light sources are connected to a circuit board, and the circuit board is connected to a battery;
   the battery and the circuit board are provided together in the housing, and the light sources, the circuit board, and the battery are covered in the housing by the lens;
   wherein the light grooves are provided along an inner edge of the housing, and the light sources are provided along the light grooves.

2. The rearview mirror having a light according to claim 1, wherein the light sources are a light strip or a light bar with LED light beads.

3. The rearview mirror having a light according to claim 2, wherein a side wall of the housing is a transparent structure, and the light strip or light bar is fixedly provided on a groove wall of the light grooves in a side standing posture, so that the LED light beads form a side standing posture and face a transparent side wall of the housing.

4. The rearview mirror having a light according to claim 3, wherein the LED light beads are further provided on the circuit board;

the LED light beads on the circuit board are located in an area enclosed by the light strip or light bar;

the housing is provided with a charging interface, and the charging interface is connected to the circuit board;

there are a plurality of heat dissipation holes provided on the housing, and the heat dissipation holes communicate inside and outside of the housing.

5. The rearview mirror having a light according to claim 2, wherein the light strip or light bar is fixed in a flat position at bottoms of the light grooves, so that the LED light beads face a back of the lens.

6. The rearview mirror having a light according to claim 5, wherein the LED light beads are further provided on the circuit board;

the housing is provided with a charging interface, and the charging interface is connected to the circuit board;

there are a plurality of heat dissipation holes provided on the housing, and the heat dissipation holes communicate inside and outside of the housing.

7. The rearview mirror having a light according to claim 1, wherein a light guiding diffuser is provided in front of the light grooves, and the light sources are covered by the diffuser to form a uniform diverging structure for light; wherein the lens is covered in front of the diffuser.

8. The rearview mirror having a light according to claim 1, wherein a fixing plate is provided inside the housing by a screw, and the lens is fixedly provided on the fixing plate by adhesive, glue or buckle.

9. The rearview mirror having a light according to claim 1, wherein a touch switch is provided on the circuit board, and a switch touch area is provided on the lens, and the switch touch area is connected to the touch switch on the circuit board to form a touch control structure.

10. The rearview mirror having a light according to claim 1, wherein the fixing mechanism comprises a fixing buckle and a movable buckle, the fixing buckle is fixedly provided in a clamp foot located on a back of the housing, the movable buckle is provided in the housing and is extended out of the back of the housing to face with the fixing buckle;

an outer surface of the movable buckle is covered with a rubber housing;

there is a sliding groove on the back of the housing, and the movable buckle is located in the sliding groove;

a spring is provided in the housing, one end of the spring is connected to the housing and the other end of the spring is connected to the movable buckle;

wherein the movable buckle is pulled towards the fixing buckle by the spring.

\* \* \* \* \*